United States Patent
Horiguchi (10) Patent No.: US 6,397,272 B1
(45) Date of Patent: May 28, 2002

(54) INTERRUPTION PROCESSING CIRCUIT FOR RECEIVING AND STORING DATA ASSOCIATED WITH AN EVENT

(75) Inventor: Isao Horiguchi, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/260,064

(22) Filed: Mar. 2, 1999

(30) Foreign Application Priority Data

Mar. 2, 1998 (JP) .......................................... 10-049437

(51) Int. Cl.$^7$ ................................................. G06F 3/00
(52) U.S. Cl. .............................. 710/48; 710/47; 710/58; 713/600
(58) Field of Search .............................. 710/15, 5, 20, 710/21, 55, 16, 40, 47, 48, 58, 262, 263, 264, 266; 711/151; 709/305; 713/600

(56) References Cited

U.S. PATENT DOCUMENTS

| | | | | |
|---|---|---|---|---|
| 4,847,750 A | * | 7/1989 | Daniel ........................ | 364/200 |
| 4,996,474 A | * | 2/1991 | Tambe et al. .............. | 324/78 D |
| 5,311,510 A | * | 5/1994 | Moriue et al. ................. | 370/61 |
| 5,404,530 A | * | 4/1995 | Koyanagi et al. ........... | 395/700 |
| 5,565,640 A | * | 10/1996 | Hasebe ........................ | 84/612 |
| 5,771,374 A | * | 6/1998 | Burshtein et al. ........... | 395/557 |
| 5,920,894 A | * | 7/1999 | Plog et al. .................. | 711/151 |
| 5,982,842 A | * | 11/1999 | Ohtsuka et al. ................. | 377/20 |

FOREIGN PATENT DOCUMENTS

| | | |
|---|---|---|
| JP | 5-158655 | 6/1993 |
| JP | 5-268201 | 10/1993 |

* cited by examiner

Primary Examiner—Thomas Lee
Assistant Examiner—RiJue Mai
(74) Attorney, Agent, or Firm—Venable; Robert J. Frank; Catherine M. Voorhees (57) ABSTRACT

An object of the present invention is to provide an interruption processing circuit which can send out an interruption information correctly to a data processor even when timing of occurrence of an interruption event is overlapped with that of its reading. An event signal indicating the occurrence of an interruption event is read and held in accordance with timing of the occurrence of an event or starting timing of data processing in a data processor and furthermore the signal held here is read and held in accordance with the subsequent processing start timing and sent out to a data processor in response to a readout signal fed by a data processor.

14 Claims, 6 Drawing Sheets

INTERRUPTION PROCESSING CIRCUIT FOR RECEIVING AND STORING DATA ASSOCIATED WITH AN EVENT

BACKGROUND OF THE INVENTION

In a system which controls two or more peripheral devices by a data processor such as a microcomputer, the data processor not only sends a control instruction to each peripheral device but also receives signals from each peripheral device as well, i.e., the exchange of signals between them is not unidirectional but bidirectional. The data processor receives an event signal by an interruption at any time from each peripheral device as well, thereby monitoring conditions of such peripheral devices and making a response to them, if necessary.

An interruption processing circuit is thus provided as an interface to input event signals coming from many peripheral devices to the data processor.

When any event occurs in peripheral devices, an event signal outputted from such devices is inputted to the interruption processing circuit. The event signal is then written on a specified register embedded in the interruption processing circuit. The event signal written on the register is held and stored therein until it is read into the data processor. The data processor, by reading the signal written on each register to be used exclusively for each peripheral device, can recognize in which peripheral device the event has occurred.

However, such conventional interruption processing circuits present the following problems.

The interruption processing circuit itself has no function to spontaneously inform a data processor of the occurrence of an event in a peripheral device. Therefore, the data processor has to send a readout signal to the interruption processing circuit in a predetermined cycle to read out a signal stored in a register embedded in the interruption processing circuit.

For example, if the event signal is active when it is a logical "1" and if the logical "1" signal is stored in the register, the data processor recognizes that an event has occurred in the corresponding peripheral device. If a logical "0" signal is stored in the register, the data processor recognizes that no event has occurred in the corresponding peripheral device.

However, an event usually occurs at any given timing in the peripheral device. Moreover, the data processor, because it cannot predict the occurrence of any event, tries to read any signal stored in the said register in a predetermined cycle.

There is, therefore, a case where the timing of the peripheral device's writing of an event signal on said register may be overlapped with that of the data processor's reading of a signal stored in the register. In such a case, the signal level read by the data processor becomes unstable and the data processor may fail to read the signal in some cases.

Furthermore, after the data processor has read the signal stored in the register, it clears the signal in the register and has a logical "0" signal stored in the register. This is done to prepare for writing of a subsequent event signal. As a result, if a peripheral device writes an event signal on the register at the same time when the data processor reads the signal stored in the register, the event signal written on the register is cleared at the subsequent timing. This means that the peripheral device fails to write the event signal on the register. In either case, it causes the data processor to fail to properly recognize the occurrence of an event in the peripheral device and the whole system to fail to fiction properly accordingly.

SUMMARY OF THE INVENTION

The present invention has been made to resolve such problems as described above. An object of the present invention is to provide an interruption processing circuit wherein a data processor does not fail to read an event signal even if the timing at which an event signal is written on the interruption processing circuit is overlapped with the timing at which a signal stored in the interruption processing circuit is read into the data processor.

Another object of the present invention is to provide an interruption processing circuit wherein a peripheral device does not fail to write an event signal even if the timing at which an event signal is written on the interruption processing circuit is overlapped with the timing at which a signal stored in the interruption processing circuit is read into the data processor.

According to the first aspect of the invention, there is provided an interruption processing circuit for receiving and storing an event signal outputted at the occurrence of an event in a peripheral device and for outputting that event signal to a data processor monitoring conditions of the peripheral device comprising a first storage device which, when the event signal is inputted from the peripheral device thereto, receives the event signal and stores it and which, when a processing start timing signal outputted before the data processor reads the event signal is inputted thereto as a control signal, stores a signal being just received and updates contents already stored in synchronization with the processing start timing signal, and a second storage device which, when the processing start timing signal is inputted thereto as a control signal, receives the signal stored before the first storage device updates contents already stored and stores it in synchronization with this processing start signal, and also continues to output the stored signal to the data processor for a period time enough for the data processor to be able to read the event signal.

In the preferred mode of the invention, wherein an output circuit is provided which is inserted into a path through which an event signal is outputted from the second storage device to the data processor and which allows the event signal outputted from the second storage device to pass therethrough from the time when the processing start timing signal becomes inactive to the time when the information readout signal being continuously outputted while the data processor is reading the event signal becomes inactive.

In another preferred mode of the invention, wherein the first storage device is provided with a first flip-flop which stores a received signal and feeds an output to the second storage device and with a first selector which selects either of a signal received in an input terminal or a signal stored in the first flip-flop and stores it into the first flip-flop; the first selector operating so as to select the signal received at the input terminal if the event signal is inputted to a control terminal and to store it into the first flip-flop and to select the signal inputted to the input terminal if the processing start timing is inputted to the control terminal and to store it into the first flip-flop, and wherein the second storage device is provided with a second flip-flop which stores the signal received from the first storage device and with second selector which selects either of a signal received from the storage device or a signal stored in the second flip-flop and stores it into the second flip-flop, the second selector selecting the signal received from the first storage device before contents stored in the flip-flop is updated if the processing start timing signal is inputted to the control terminal, and contents stored in the second flip-flop being initialized by a clearing signal inputted into the control terminal after the data processor has completed the readout of the event signal.

According to the second aspect of the invention, there is provided an interruption processing circuit for receiving and storing data outputted at the occurrence of an event in a peripheral device and for outputting that data to a data processor monitoring conditions of the peripheral device comprising a first storage device which, when the data is inputted from the peripheral device thereto, receives that data and stores it and which, when a processing start timing signal outputted before the data processor reads the data is inputted thereto as a control signal, stores data being just received and updates contents already stored in synchronization with this processing start timing signal, and a second storage device which, when the processing start timing signal is inputted thereto as a control signal, receives data stored before the first storage device updates contents already stored and stores it in synchronization with this processing start signal, and also continues to output the stored data to the data processor for a period time enough for the data processor to be able to read the event signal.

In the preferred mode of the invention, wherein an output circuit is provided which is inserted into a path through which data is outputted from An the second storage device to the data processor and which allows the data outputted from the second storage device to pass therethrough from the time when the processing start timing signal becomes inactive to the time when the information readout signal being continuously outputted while the data processor is reading the event signal becomes inactive.

DETAILED DESCRIPTION OF THE INVENTION

First Embodiment

Figure 1:
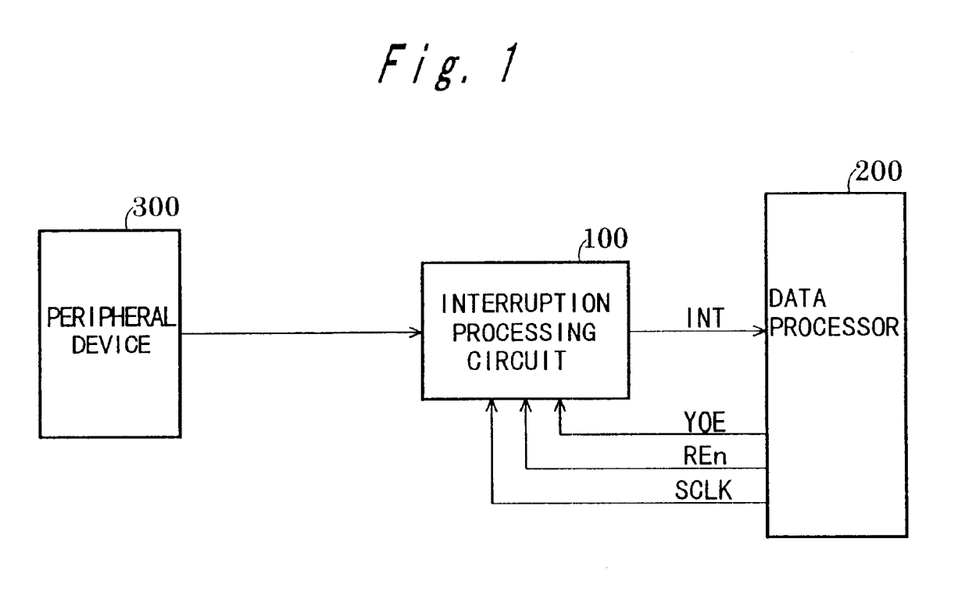
FIG. 1 is a diagram showing connections between the interruption processing circuit 100 and a data processor 200 of the present invention.

FIG. 1 is a block diagram illustrating connections between the interruption processing circuit 100 and the data processor 200 of the present invention.

In FIG. 1, the data processor 200 receives an event signal ALM transmitted by an interruption instruction at any time from the peripheral device 300 and make a response if necessary. Though only one peripheral device has been shown in this figure, a plurality of peripheral devices may be connected according to the present invention. The interruption processing circuit 100 is an interface used to input event signals ALM outputted from many peripheral devices (not shown) to the data processor 200. This interruption processing circuit 100 receives an information readout signal YOE, processing start timing signal REn and system clock SCLK from the data processor 200. The information readout signal YOE is a signal which becomes active during execution of readout operations of the data processor 200. The processing start timing signal REn is a signal which is held active for a predetermined time immediately before the data processor 200 starts to read out an event signal. The system clock SCLK is a signal used to control the operation timing of the interruption processing circuit 100.

Moreover, as described later, the information readout signal YOE is a signal which becomes active at a logical "0" while the processing start timing signal REn is a signal which becomes active at a logical "1".

Figure 2:
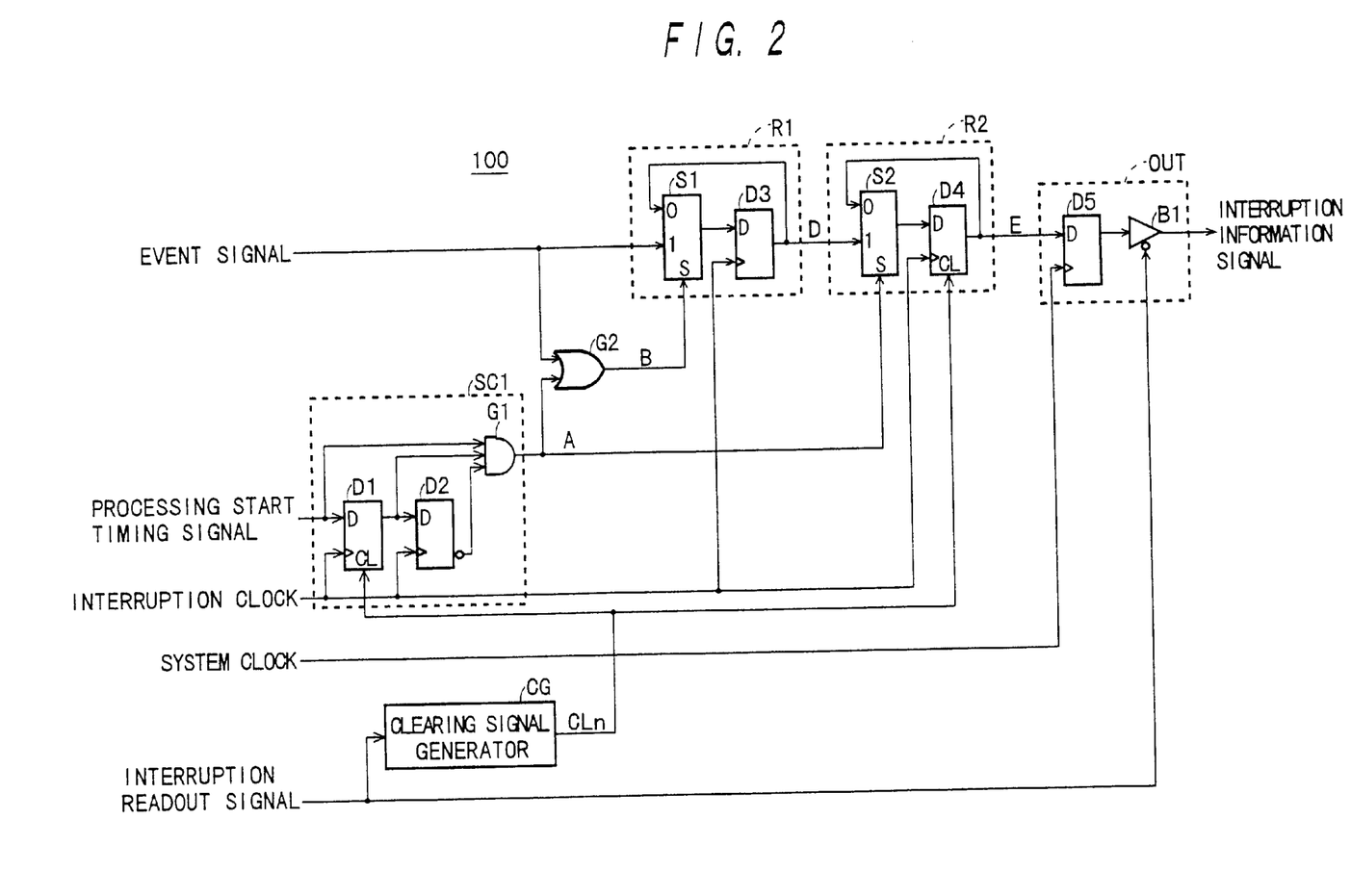
FIG. 2 is a diagram illustrating internal configurations of the interruption processing circuit 100 of the present invention.

FIG. 2 is a diagram showing main internal configurations of said interruption processing circuit 100 of the present invention.

In FIG. 2, a one-shot circuit SC1 composed of two D latches (D-type flip-flop) D1, D2 and an AND gate G1 is a circuit used to output a logical "1" pulse signal A corresponding to one period of an interruption clock WCLK through the AND gate when the logical level of said processing start timing signal REn is changed from "0" to "1". When the logical "1" signal is inputted to the D latch D1, the AND gate is opened, allowing the processing start timing signal REn to be outputted from the AND gate G1. Also, when the logical "1" signal is transferred from the D latch D1 to D2, the AND G1 gate is closed. This is an operation of the one-shot circuit SC1. Furthermore, the processing start timing signal REn is a logical "1" signal used to inform the interruption processing circuit of the start timing of data processing cycle in the data processor 200.

An OR gate G2 outputs a logical "1" pulse signal B while an event signal ALM fed from outside is a logical "1" or while said pulse signal A is a logical "1". The said event signal ALM is a signal by which a peripheral device informs, through the interruption processing circuit, the data processor of the presence or absence of an event in a peripheral device which may cause an interruption and if the signal ALM is a logical "1", it shows a condition where an event has occurred while, if it is a logical "0", it shows a condition where no event has occurred. That is, the OR gate outputs a logical "1" pulse signal B at the timing of processing of each data in the data processor 200 and the timing of the occurrence of an interruption event.

A first register R1 is composed of a 2TO1(2 inputs 1 output) selector and

A first register R1 is composed of a 2TO1(2 inputs 1 output) selector S1 and D latch D3. The 2TO1 selector S1, while a logical "1" pulse signal B is being fed, selects the said event signal ALM out of signals including a signal D outputted from said D latch D3 and said event signal, and feeds it to the D latch D3. On the other hand, the 2TO1 selector S1, while a logical "0" pulse B is being fed, selects the signal D outputted from the D latch D3 and feeds it again to the D latch D3. The D latch D3 reads the signal fed from the 2TO1 selector under the timing control of an interruption clock WCLK and holds it and then continues to output an output signal D to the 2TO1 selector and a second register R2.

That is, the said first register R1 is designed to read said event signal ALM at a timing of starting the processing of each data or under the timing control of an interruption clock WCLK only during the period of time of the occurrence of an interruption event. Also, the first register R1 does not read the event signal ALM during the period of time other than described above and continues to hold the content read finally therein and then to continuously feed it as a signal D to a second register R2.

A second register R2 is composed of a 2TO1 selector S2 and a D latch D4. The 2TO1 selector S2, while a logical "1" pulse signal A is being fed, selects the signal D out of signals including the signal E outputted from the D latch D4 and signal D fed by said first register R1, and feeds it to the D latch D4. On the other hand, the 2TO1 selector S2, while a logical "0" pulse A is being fed, selects the signal E outputted from the D latch D4 and feeds it again to the D latch D4. The D latch D4 reads the signal fed from the 2TO1 selector S2 under the timing control of an interruption clock WCLK and continues to hold it and then continues to feed an output signal to the 2TO1 selector S2 and an output circuit OUT.

That is, the second register R2 is designed to read the signal D fed from the first register R1 under the timing control of an interruption clock WCLK only during the period of timing of starting processing of each data in the data processor 200. Also, the second register R2 does not read the event signal ALM during the period of time other than described above and continues to hold the content read finally therein and then to continuously feed it as a signal E to the output circuit OUT.

The output circuit OUT consisting of the D latch D5 and a tri-state buffer B1 reads said signal D under the timing control of the system clock SCLK of the data processor and holds it. Moreover, the output circuit, when a logical "0" interruption information readout signal YOE is fed from the data processor 200, sends out the held signal as an interruption information signal INT to the data processor 200 while the YOE signal is being active.

A clearing signal generator circuit CG produces a logical "1" clearing signal when the logical level of the interruption information readout signal YOE is changed from "0" to "1" and feeds this signal to said D latch D1 and D4. Each of D latches from D1 to D4, when a logical "1" clearing signal CLn is inputted therein, resets and initializes its held content.

One example of actual operations of the interruption processing circuit 100 featured by configurations shown in FIG. 2 will be described hereinbelow with reference to FIGS. 3 and 4.

Figure 3:
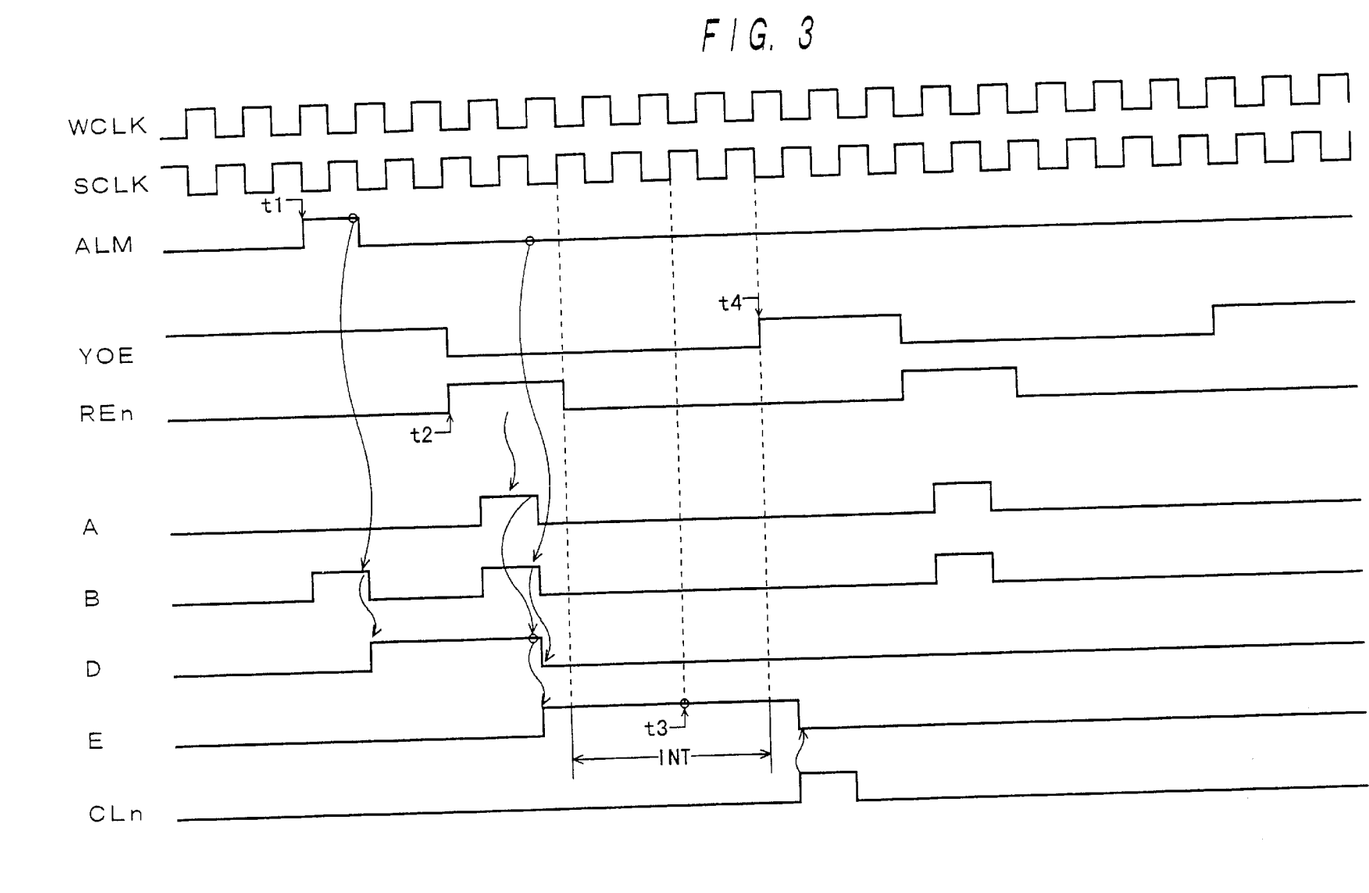
FIG. 3 is a timing chart illustrating operations of the interruption processing circuit 100 in the case where there is a shift in timing between the occurrence of an interruption and the readout of the interruption signal.

FIG. 3 is a timing chart illustrating internal operations of the interruption processing circuit 100 in the case where there is a shift in timing between the occurrence of an interruption event (i.e., when the event signal ALM becomes a logical "1") and the readout of the interruption signal (i.e., when the interruption information signal YOE becomes a logical "0").

As shown in FIG. 3, when a logical "1" signal indicative of the occurrence of an interruption event is fed at the time t1, the OR gate simultaneously outputs a logical "1" pulse signal B and feeds it to the first register R1. The first register R1, responding to the logical "1" pulse signal B, reads the event signal ALM and holds it. At this point, the first register R1 starts to output a logical "1" signal and when the pulse signal B becomes a logical "0", because the selector S1 selects the output from the first register R1, the first register R1 continues to feed a logical "1" signal D to the second register R2 as shown in FIG. 3.

After that, if a logical "1" processing start timing signal REn is fed at the time t2 from the data processor 200, the one-shot circuit SC1 composed of the D latches D1, D2 and the AND gate feeds a logical "1" pulse signal A to the second register R2. When such a logical "1" pulse signal A is inputted into the OR gate G2, the OR gate G2 again generates a logical "1" pulse signal B and feeds it to the first register R1. The register R1, responding to the logical "1" pulse signal B, reads an event signal ALM and holds it. Because the logical level of said event signal ALM is "0" while the pulse signal B is a logical "1", the first register R1 reads the logical "0" signal D and sends out its output. Immediately before this, the second register R2 receives the logical "1" pulse signal A and reads a logical "1" signal D outputted from the register R1 and holds it.

The second register R2 also operates in the same manner as the register R1 and, even after the logical level of the pulse signal A is changed from "1" to "0", it continues to output a logical "1" signal E to the output circuit OUT. On the other hand, because the output circuit OUT has been fed with an interruption information readout signal YOE that becomes active at the logic "0" by the data processor, it receives the logical "1" signal E and holds it, and then sends out an interruption information signal INT at the time t3 to the data processor under the timing control of the interruption clock to the data processor. The data processor 200 reads the interruption information signal INT at this timing. After that, when the logical level of the interruption information readout signal YOE is changed from "0" to "1" at the time t4, a clearing signal generator circuit CG generates a logical "1" clearing signal CLn. By this signal, both said D latches D1 and D4 are reset and the logical level of the signal E is changed from "1" to "0".

Thus, when the period for which the interruption event signal remains a logical "1" (i.e., the time covering one clock period from the time t1) and the period for which its readout signal remains a logical "0" (i.e., the time from t2 to t4) are shifted each other in time, an interruption information signal INT indicating the occurrence of an Interruption is normally sent out, responding to a logical "0" interruption information readout signal YOE fed by the data processor immediately after the occurrence of the interruption event.

The timing at which the signal INT becomes active is shown on the signal line in FIG. 3. The period for which the signal INT becomes active is from the time when the processing start timing signal becomes inactive to the time when the information readout signal becomes inactive. This serves to remove unstable parts of the level of the signal E at both ends, thereby improving reliability of the output signal.

Figure 4:
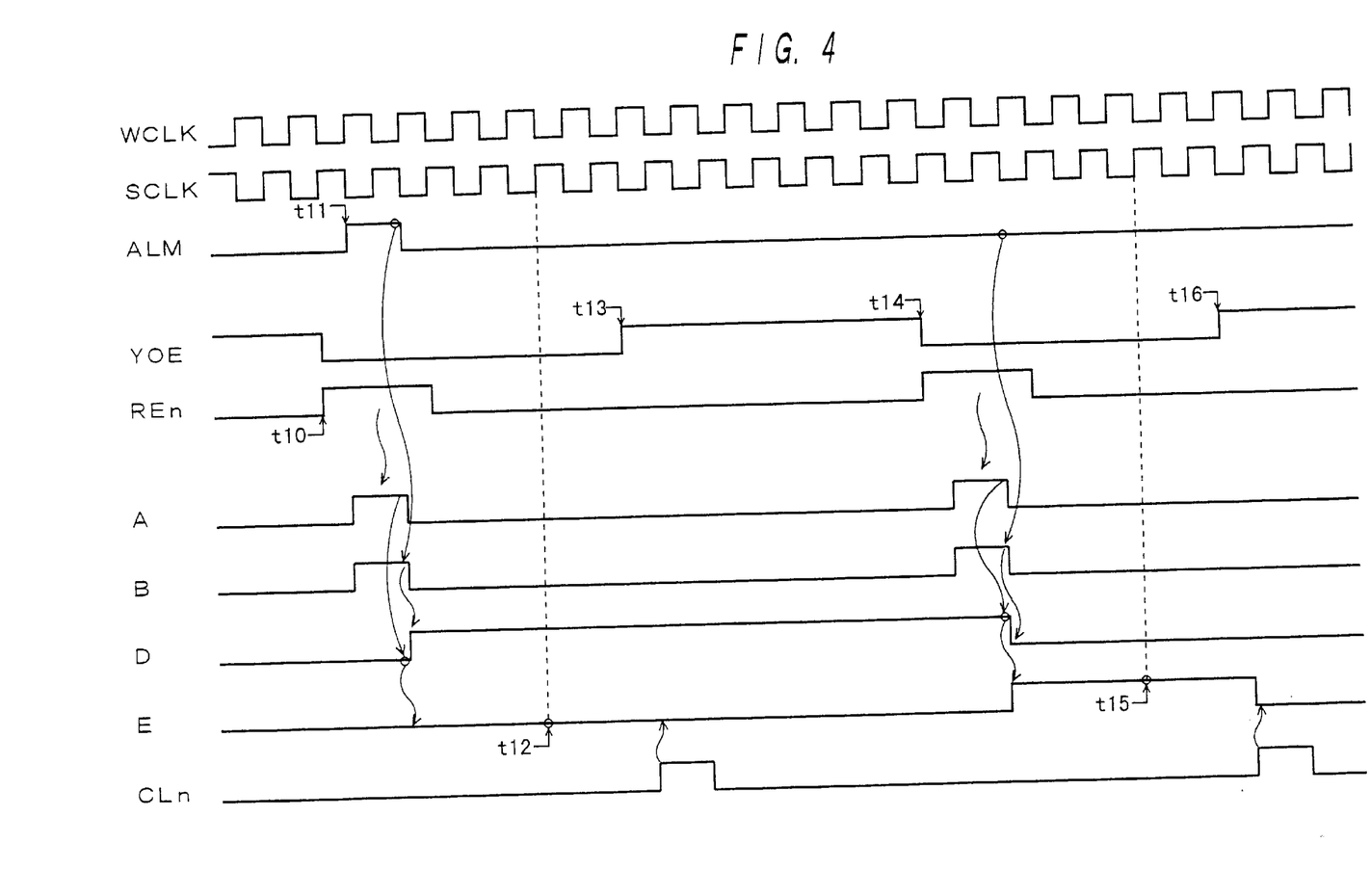
FIG. 4 is a timing chart of illustrating operations of the interruption processing circuit 100 in the case where the timing of the occurrence of an interruption is overlapped with that of reading out the interruption signal.

FIG. 4 is a timing chart illustrating operations in the case where the timing of the occurrence of the interruption event (i.e., when the event signal ALM is a logical "1") is overlapped with that of the readout of the interruption event signal (i.e., when the interruption information readout signal YOE is a logical "0"). How an interruption information signal INT indicating the occurrence of an event can be normally sent out in this case as well will be described below with reference to FIG. 4.

Firstly, at the time t10, a logical "1" processing start timing signal REn and a logical "0" interruption readout signal YOE are fed from the data processor 200. At the time when the logical "1" processing start timing REn and the logical "0" interruption information readout signal YOE are being fed, a logical "1" event signal ALM indicating the occurrence of an event is fed.

When such a logical "1" processing start timing signal REn as described above is inputted, the one-shot circuit composed of the D latches D1, D2 and the AND gate generates a logical "1" pulse signal A and feeds it to the second register R2. Also, when such a logical "1" pulse signal A is inputted, the OR gate generates a logical "1" pulse signal B and feeds it to the first register R1. The first register R1, when such a logical "1" pulse signal B is inputted thereto, reads the event signal ALM and holds it. At this point, when the first register R1 starts to output a logical "1" signal and the pulse signal B becomes a logical "0", because the selector S1 selects the output from the register 1 and send out its output, the first register R1 feeds a logical "1" signal D to the second register R2 as shown in FIG. 4. On the other hand, because a logical "1" pulse signal A is inputted into the second register R2 at the same timing as for the first register, the second register R2 reads the output signal D which is available before the first register R1 reads the event signal ALM, and holds it. Because the logical level of said signal D is "0", the second register R2 sends out a logical "0" signal E to the output circuit OUT as shown in FIG. 4.

During these operations, because a logical "0" interruption information readout signal YOE is fed from the data processor 200, the output circuit OUT receives the logical "0" signal E and sends out an interruption information signal INT to the data processor 200. The data processor 200 reads the interruption information signal INT at the time t12, responding to said pulse signal E. After that, when the logical level of the interruption information readout signal YOE is changed from "0" to "1" at the time t13, the clearing signal generator circuit CG produces a logical "1" clearing signal CLn. By this signal, said D latches D1 and D4 are reset together. Before and after this, the logical level of the signal E remains "0" with no change.

Now, if a logical "<"interruption information readout signal YOE and a logical "1" processing start timing signal REn are fed from the data processor 200 at the time t14, the one-shot circuit SC1 consisting of the D latches D1, D2 and the AND gate outputs a logical "1" pulse signal A and feeds it to the second register R2, The OR gate G2, when such a logical "1" pulse signal A is fed thereto, generates a logical "1" pulse signal B and feeds it to the first register The first register R1, if a logical "1" pulse signal B is inputted thereto, *reads an event signal ALM and holds it. At this point, when the first register R1 starts to output a logical "1" signal and the logical level of the pulse signal B becomes "0", because the selector S1 selects the output from the first register R1 and sends out its output, the first register R1 feeds a logical "0" signal D to the second register R2 as shown in FIG. 4. On the other hand, the second register R2, when a logical "1" pulse signal A is inputted thereto, reads the output signal D from the first register R1 and holds it. Because the logical level of said signal D is "1", the second register R2 sends out a logical "1" signal E to the output circuit OUT as shown in FIG. 4.

During these operations, the output circuit OUT, because a logical "0" interruption information readout signal YOE is being fed thereto from the data processor 200, reads a logical "1" signal E and sends out an interruption information signal INT to the data processor 200. The data processor 200 reads the interruption information signal INT at the time t15, responding to said signal E. Then, when the logical level of the interruption information readout signal YOE is changed from "0" to "1" at the time t16, the clearing signal generator circuit CG produces a logical "1" clearing signal CLn. By this signal, said D latches D1 and D4 are reset together and the logical level of the signal E is changed from "1" to "0".

Figure 5:
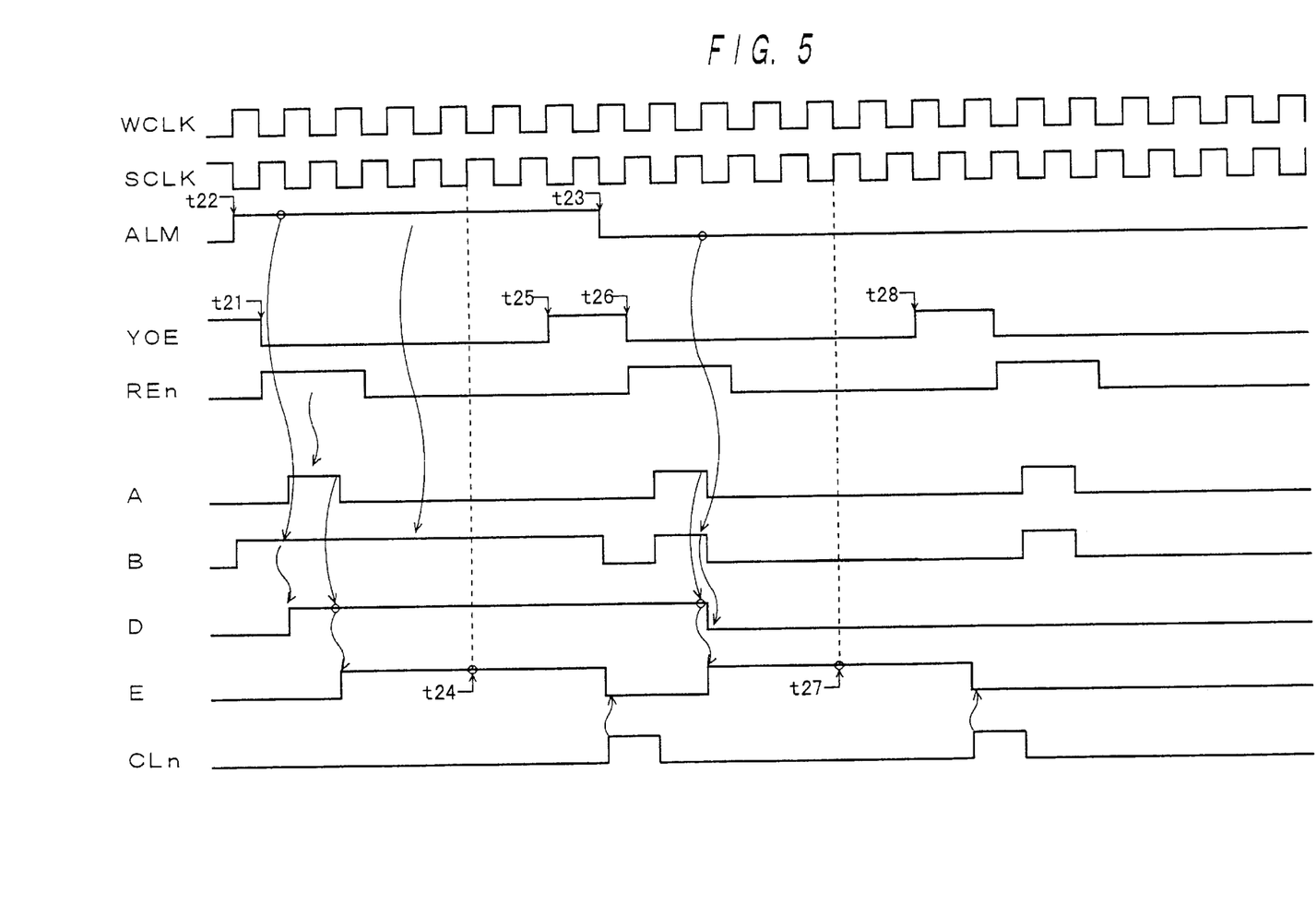
FIG. 5 is a timing chart of illustrating operations of the interruption processing circuit 100 in the case where the timing of the occurrence of an interruption is overlapped with that of reading out the interruption signal and also where the duration of the occurrence of an interruption is continuous.

FIG. 5 is a timing chart illustrating operations in the case where the timing of the occurrence of an interruption event is overlapped with that of reading out the interruption signal and where this interruption event occurs continuously. The operations in this case will be described with reference to FIG. 5 as well.

In FIG. 5, a logical "1" processing start timing signal REn and a logical "0" interruption information readout signal YOE are fed at the time t21 from the data processor 200. At this point, a logical "1" event signal ALM indicating the occurrence of an interruption event is fed for a period (from the time t22 to t23) which is longer than that for which a logical "0" interruption information readout signal YOE is being fed.

At this time, the OR gate, while the logical level of the event signal ALM remains "1", generates a logical "1" pulse signal B and feeds it to the first register R1. Also, as described above, the one-shot circuit consisting of the D latches D1, D2 and the AND gate G1, if a logical "1" processing start timing signal REn is inputted thereto, generates a logical "1" pulse signal A and feeds it to the second register R2.

The first register R1, when such a logical "1" pulse signal B is inputted thereto, reads the event signal ALM and holds it. At this point, when the first register R1 starts to output a logical "1" signal and the logical level of the pulse signal B becomes "0", because the selector S1 selects the output from the first register R1 and sends out its output, the first register R1 feeds a logical "1" signal D to the second register R2. On the other hand, the second register R2, responding to a logical "1" pulse signal A, reads the output signal D from the first register R1 and holds it. Because the logical level of the signal D read from the first register R1 is "1", the second register R2 continues to output a logical "1" signal E to the output circuit OUT.

During these operations, the output circuit OUT, because a logical "0" interruption information readout signal YOE is being fed thereto from the data processor, sends out a logical "1" output signal E as an interruption information signal INT to the data processor 200. At the time t24, the data processor 200 reads the interruption information signal INT responding to said signal E. Then, at the time t25 when the logical level of the interruption information readout signal YOE is changed from "0" to "1", the clearing signal generator circuit CG produces a logical "1" clearing signal CLn. By this signal, said D latches D1 and D4 are reset together and the logical level of the signal E is changed from "1" to "0". After that, at the time t23 when the logical level of the event signal ALM is changed from "1" to "0", the logical level of the signal B outputted from the OR gate is changed from "1" to "0" as well.

Now, if a logical "0" interruption information readout signal YOE and a logical "1" processing start timing signal REn are again fed by the data processor, the one-shot circuit consisting of the D latches D1, D2 and the AND gate produces a logical "1" pulse signal A and feeds it to the second register R2. In addition, the OR gate, when a logical "1" pulse signal A is inputted thereto, generates a logical "1" pulse signal B and feeds it to the first register R1.

The first register R1, responding to the logical "1" pulse signal B, reads the event signal ALM and holds it. At this point, when the first register R1 starts to output a logical "1" signal and the logical level of tie pulse Signal P becomes "0", because the selector S1 selects the output from the first register R1 and sends out its output, the first register R1 feeds a logical "0" signal D to the second register R2. On the other hand, the second register R2, responding to the logical "1" pulse signal A, reads the output signal D of the first register R1 and holds it. Because the logical level of the signal D read from the first register R1 is "1", the second register R2 continues to output a logical "1" signal E to the output circuit OUT.

During these operations, the output circuit OUT, because a logical "0" interruption information readout signal YOE is being fed thereto from the data processor 200, sends out the logical "1" output signal E as an interruption information INT to the data processor 200. At the time t27, the data processor 200 reads the interruption information signal INT responding to said signal E. Then, at the time t28 when the logical level of the interruption information readout signal YOE is changed from "0" to "1", the clearing signal generator circuit CG produces a logical "1" clearing signal CLn. By this signal, said D latches D1 and D4 are reset together, and the logical level of the signal E is changed from "1" to "0".

As described above, when an event signal indicative of the occurrence of an interruption event in peripheral devices is inputted to the interruption processing circuit 100, the first register R1 has a function to store the event signal. Also, when the processing start timing signal outputted before the data processor reads the event signal is fed as a control signal, the register R1 has a function to update the stored contents by memorizing the signal just receiving at that time in synchronization with the processing start timing signal.

When an event signal is inputted at an arbitrary timing, the first register stores the event signal immediately. On the other hand, when a processing start timing signal is inputted as a control signal, the second register receives and memorizes the signal stored in the first register. Immediately after that, the first register receives and memorizes a signal inputted to the input terminal.

If a logical "1" event signal has been inputted to the input terminal, the first register stores the event signal. Or, if a logical "0" signal has been inputted to the input terminal, the first register stores the signal. When a logical "0" signal is stored, the first register is reset, resulting in the same effect as initialization. Because the second register receives and memorizes the contents stored before being initialized, the signal that the first register has stored once will not go off.

Furthermore, the first register R1 and the second register R2 are means for storing an event signal and therefore not only such a register but also a variety of storing means including memory and the like that can memorize an inputted event signal for a necessary period of time may be used as well.

By operations described above, the first register R1, immediately before the data processor 100 starts to read an event signal, feeds the signal that it had held until that time to the second register and can then receive a new event signal.

On the other hand, because the second register R2, before the data processor 200 starts operations of reading an event signal, receives the event signal from the fight register R1 and holds and continues to store it, the data processor 200 does not receive an input signal while reading the event signal and therefore a collision of operations of reading out a signal with that of writing the same does not occur.

That is, because, while the data processor 200 is reading the signal from the second register R2, the second register R2 continues to hold a specified signal, the reliability of the output signal from the second register is improved.

The output circuit provided on the output side of the second register has the following functions.

This output circuit is inserted into a path through which a signal is outputted from the second register to the data processor.

The data processor 200 executes operations of reading the signal outputted from the second register R2 at an arbitrary timing during the period from the time when a processing start timing signal REn becomes inactive to the time when the interruption information readout signal YOE remains active. If the time for holding contents of a signal outputted from the second register R2 is sufficiently long, the data processor can read exactly an event signal a synchronously with a clock used to control operations of an interruption control circuit.

Thus, by introducing the D latch D5 which operates in synchronization with a system clock SCLK and a tri-state buffer B1, only during the period from the time when a processing start timing signal becomes inactive to the time when a information readout signal becomes inactive, an output of an interruption information signal INT to the data processor 200 is made possible. <Second Embodiment>

Figure 6:
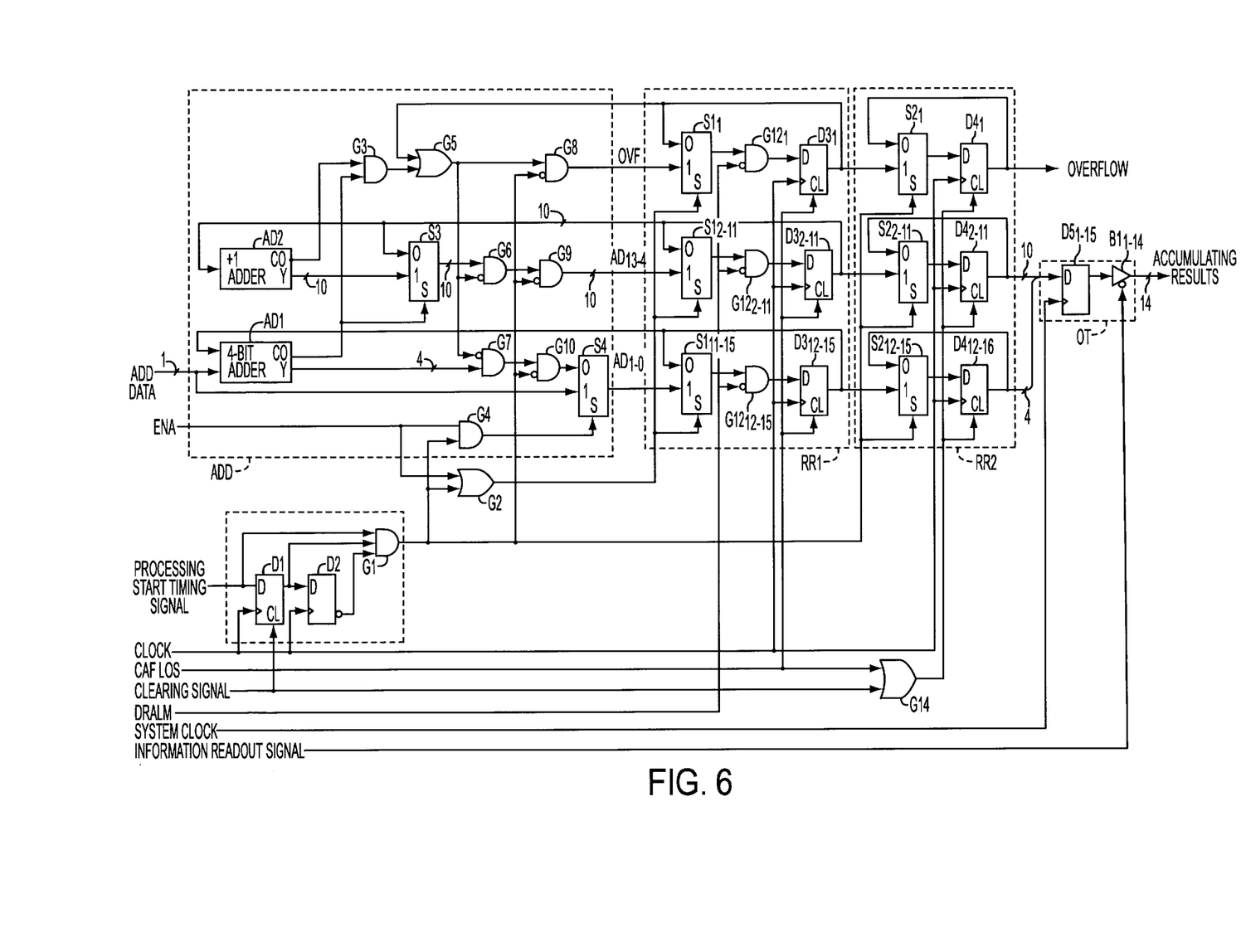
FIG. 6 is a diagram showing another embodiment of the interruption processing circuit of the present invention.

FIG. 6 is a block diagram of an interruption processing circuit showing another embodiment of the present invention.

This device receives add data together with an event signal from a peripheral device (not shown). The add data is numeric data outputted from the peripheral device. An accumulating circuit ADD receives the add data, performs arithmetic and inform a data processor of its accumulating arithmetic results. The data processor operates in such a manner that it accesses the interruption processing circuit at a predetermined cycle to read this accumulating arithmetic results for use. This embodiment shows that the data processor can read not only an event signal but also data which can be rewritten every time an event occurs from the interruption processing circuit a synchronously with the occurrence of the event. Moreover, as examples of data which can be rewritten every time an event occurs, such accumulating arithmetic results obtainable from the accumulating arithmetic ADD are given here, however, such data is not limited to numeric data and it may include code or character data and the like.

As shown in FIG. 6, the interruption processing circuit is provided with an accumulating circuit ADD, first register RR1, second register RR2, output circuit OT and one-shot circuit SC1. The accumulating circuit ADD receives add data together with an enable signal ENA being analogous to an event signal and outputs arithmetic results AD11-4, AD4-1 and overflow signal OVF. The first register RR1 is a circuit having the completely same functions as those shown in the First Embodiment, which receives added results AD11-4, AD-1 and overflow signal OVF, instead of an event signal, and stores them therein. The second register RR2 is a circuit having the same functions as those shown in the First Embodiment, which receives and stores an output from the first register RR1 and continues to output the signal until the data processor (not shown) reads it therein. Furthermore, the overflow signal stored in the second register RR2 is fed to an error processing circuit (not shown) for use in overflow error processing.

Both the output circuit OT and the one-shot circuit SC1 have the same functions as those shown in the First Embodiment.

The signal CAF_LOS out of other signals inputted to this interruption processing circuit is a signal fed, at an appropriate time, by the data processor in order to initialize accumulating arithmetic results stored in all registers. The signal ORALM is a signal used to open or close gates of the first register RR1.

In FIG. 6, the 4-bit adder embedded in the accumulating arithmetic circuit ADD feeds 4-bit accumulating added data AD3-0 obtained by adding the fed 4-bit added data to low order 4 bits of accumulated arithmetic results made available by the present time through AND gates G7, G10 and 2TO1 selector S4 to the first register RR1. At this point, if the logical level of all accumulating added data AD3-0 becomes "1", the 4-bit adder feeds a logical "1" carry signal CO to each of an AND gate G3 and a 2TO1 selector 3. The +1 adder AD2 feeds 10-bit added results obtained by adding 1 to high order 10 bits of accumulating added results made available by the present time to a 2TO1 selector S3. The 2TO1 selector 83, only when a logical "1" carry signal CO is fed thereto by said 4-bit adder AD1, feeds 10-bit added results given by said +1 adder AD2 as accumulating added data AD13-4 through the AND gates G6 and G9 to the first register group PR1. Now , if the logical level of all accumulating added data AD13-4 becomes "1", the +1 adder AD2 feeds a logical "1" carry signal CO to the AND gate G3. The AND gate G3, when a logical "1" carry signal CO is fed by each of said 4-bit adder AD1 and +1 adder AD2 thereto, feeds a logical "1" overflow signal OVF through the OR gate G5 and AND gate G8 to the first register group RR1.

The said accumulating arithmetic circuit ADD feeds each of 14-bit accumulating added data AD13-0 obtained by accumulating arithmetic of the 4-bit added data and its overflow signal OVF to the first register group RR1.

The first register group RR1, each of which operates substantially in the same manner as the first register R1 shown in FIG. 2, includes a group of registers consisting of 15 systems which correspond to each of said accumulating added data AD13-0 and the overflow signal OVF. Each of the AND gates $12_{1-15}$ embedded in the first register group RR1 is provided to reset all of the D latches $D3_{1-15}$ synchronously. Similarly, the second register RR2, each of which is of the same configuration as for the second register R2 shown in FIG. 2, includes a group of registers consisting of 16 systems. Moreover, the output circuit OT composed of 14 systems of output circuits having the same functions as in the output circuit OUT shown in FIG. 2 are provided in order to output the fed accumulating arithmetic results as accumulating arithmetic data RD13-0. Also, the one-shot circuit comprising the D latches D1, D2 and the AND gate G1 having the same functions as shown in FIG. 2 is provided.

The interruption processing circuit illustrated in this Second Embodiment can handle not only event signals but also a variety of data inputted together with event signals.

The interruption processing circuit shown in this embodiment also can send out correctly signals indicating various types of information about the occurrence of an event and its related matters to the data processor.

What is claimed is:

1. An interruption processing circuit for receiving and storing an event signal outputted at the occurrence of an event in a peripheral device and for outputting that event signal to a data processor monitoring conditions of said peripheral device comprising:

a first storage device which, when said event signal is inputted from said peripheral device thereto, receives the event signal and stores it until a processing start timing signal outputted from said data processor is inputted thereto; and a second storage device where upon the input of said processing start timing signal thereto, the signal stored in said first storage device is transferred to the second storage device, and said second storage device stores the transferred event signal until a timing defined by an interruption information readout signal from said data processor, wherein said second storage device outputs the stored signal to said data processor at the timing defined by the interruption information readout signal, the timing being later than that defined by said processing start timing signal.

2. The interruption processing circuit as claimed in claim 1, wherein an output circuit is provided which is inserted into a path through which an event signal is outputted from said second storage device to said data processor and which allows the event signal outputted from said second storage device to pass therethrough from the time when said processing start timing signal becomes inactive to the time when the information readout signal being continuously outputted while said data processor is reading said event signal becomes inactive.

3. An interruption processing circuit for receiving and storing an event signal outputted at the occurrence of an event in a peripheral device and for outputting that event signal to a data processor monitoring conditions of said peripheral device comprising:

a first storage device which, when said event signal is inputted from said peripheral device thereto, receives the event signal and stores it until a processing start timing signal outputted from said data processor is inputted thereto; and a second storage device which, when said processing start timing signal is inputted thereto, receives the signal stored before in said first storage device and stores it until a timing defined by an interruption information readout signal from said data processor;

wherein said second storage device outputs the stored signal to said data processor at the timing defined by the interruption information readout signal, the timing being later than that defined by said processing start timing signal, and wherein said first storage device is provided with a first flip-flop which stores a received signal and feeds an output to said second storage device and with a first selector which selects either of a signal received in an input terminal or a signal stored in said first flip-flop and stores it into said first flip-flop; said first selector operating so as to select the signal received at the input terminal if said event signal is inputted to a control terminal and to store it into said first flip-flop and to select the signal inputted to said input terminal if said processing start timing is inputted to the control terminal and to store it into said first flip-flop, and wherein said second storage device is provided with a second flip-flop which stores the signal received from said first storage device and with a second selector which selects either of a signal received from said first storage device or a signal stored in said second flip-flop and stores it into said second flip-flop, said second selector selecting the signal received from said first storage device before contents stored in said flip-flop are updated if said processing start timing signal is inputted to the control terminal, and contents stored in said second flip-flop being initialized by a clearing signal inputted into the control terminal after said data processor has completed the readout of the event signal.

4. The interruption processing circuit as claimed in claim 3, further comprising:
a one-shot circuit including third and fourth flip-flops, said third flip-flop receiving, at its input terminal, the processing start timing signal and sending its output to the input terminal of the fourth flip-flop, the output of the fourth flip-flop being negated, and an AND gate having three inputs, which receive the processing start timing signal from the data processor, the output of the third flip-flop and the output of the fourth flip-flop; and
an OR gate, one input of which receives the event signal from a peripheral device and the other input receives a signal from the AND gate, the output of the OR gate being sent to the control terminal of the first selector, where the AND gate is opened when the processing start timing signal is inputted to the third flip-flop allowing the processing start timing signal to be outputted from the AND gate to an input of the OR gate and to the control terminal of the second selector.

5. The interruption processing circuit as claimed in claim 4, wherein the first, second, third and fourth flip-flops are under the timing control of an interruption clock.

6. The interruption processing circuit as claimed in claim 3, further comprising an ouput circuit including a fifth flip-flop and a tri-state buffer where the input terminal of the fifth flip-flop receives the output signal of the second flip-flop and the input of the tri-state buffer receives the output signal of the fifth flip-flop and the fifth flip-flop is under the timing control of a system clock, wherein the output circuit sends out an interruption information signal as a hold signal when the data processor inputs the timing defined by the interruption information readout signal to the tri-state buffer.

7. The interruption processing circuit as claimed in claim 3, wherein the circuit receives data together with the event signal from a peripheral device, further comprising an accumulating circuit that performs arithmetic computations and informs the data processor of its results, and wherein a signal is fed from the data processor to the first flip-flop to initialize accumulating arithmetic results stored in registers of the first storage device.

8. The interruption processing circuit as claimed in claim 7, farther comprising:
a one-shot circuit including third and fourth flip-flops, said third flip-flop receiving, at its input terminal, the processing start timing signal and sending its output to the input terminal of the fourth flip-flop, the output of the fourth flip-flop being negated, and an AND gate having three inputs, which receive the processing start timing signal from the data processor, the output of the third flip-flop and the output of the fourth flip-flop; and
an OR gate, one input of which receives an enable signal from a peripheral device and the other input receives a signal from the AND gate, the output of the OR gate being sent to the control terminal of the first selector, where the AND gate is opened when the processing start timing signal is inputted to the third flip-flop allowing the processing start timing signal to be outputted from the AND gate to an input of the OR gate, to an input of a logical device in the accumulating circuit and to the control terminal of the second selector.

9. The interruption processing circuit as claimed in claim 8, wherein the first, second, third and fourth flip-flops are under the timing control of the same clock.

10. The interruption processing circuit as claimed in claim 8, further comprising an ouput circuit including a fifth flip-flop and a tri-state buffer where the input terminal of the fifth flip-flop receives the output signal of the second flip-flop and the input of the tri-state buffer receives the output signal of the fifth flip-flop and the fifth flip-flop is under the timing control of a system clock, wherein the output circuit sends out an interruption information signal as a hold signal when the data processor inputs the timing defined by the interruption information readout signal to the tri-state buffer.

11. The interruption processing circuit as claimed in claim 10, wherein the first storage device includes a number of first flip-flops and associated first selectors, the number of first flip-flops receive either accumulated data or an overflow signal from the accumulating circuit, said first storage device further comprising an AND gate between a respective first flip-flop and an associated first selector, which is provided to reset all of the first flip-flops synchronously.

12. The interruption processing circuit as claimed in claim 11, wherein the second storage device includes a number of second flip-flops and associated second selectors, an overflow output of the accumulating circuit is inputted to one first selector and then to its associated first flip flop, the associated first flip-flop sends its output to one second selector and associated flip-flop, which outputs an overflow signal.

13. An interruption processing circuit for receiving and storing data outputted at the occurrence of an event in a peripheral device and for outputting that data to a data processor monitoring conditions of said peripheral device comprising:
a first storage device which, when said data is inputted from said peripheral device thereto, receives that data and stores it until a processing start timing signal outputted from said data processor is inputted thereto; and
a second storage device where upon the input of said processing start timing signal thereto, data stored in said first storage device is transferred to the second storage device, and said second storage device stores the transferred data until a timing defined by an interruption information readout signal from said data processor,
wherein said second storage device outputs the stored data to said data processor at the timing defined by the interruption information readout signal, the timing being later than that defined by said processing start timing signal.

14. The interruption processing circuit as claimed in claim 13, wherein an output circuit is provided which is inserted into a path through which data is outputted from said second storage device to said data processor and which allows the data outputted from said second storage device to pass therethrough from the time when said processing start timing signal becomes inactive to the time when the information readout signal being continuously outputted while said data processor is reading said event signal becomes inactive.

* * * * *